Patented Apr. 1, 1941

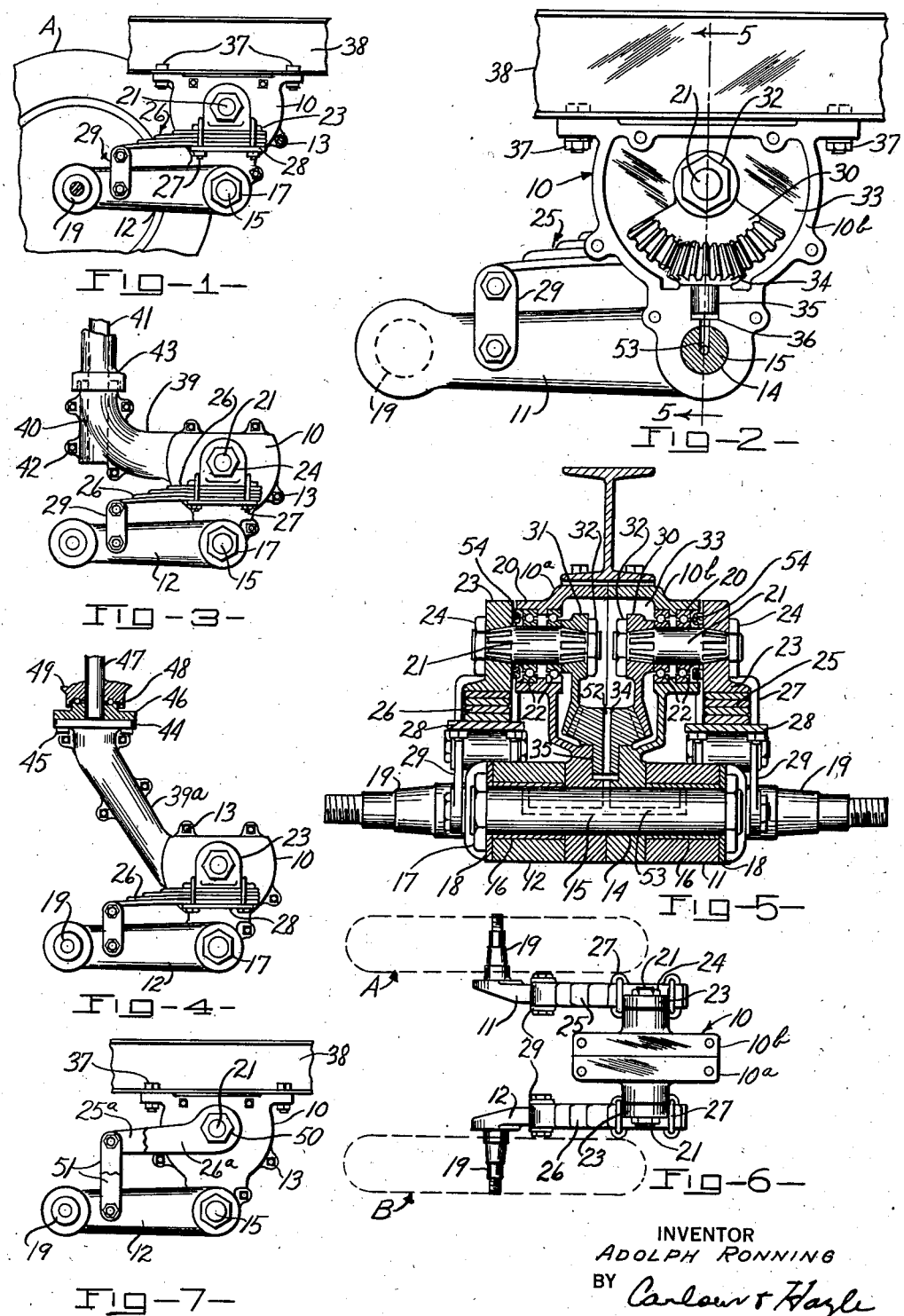

2,236,734

UNITED STATES PATENT OFFICE 2,236,734

VEHICLE WHEEL SUSPENSION

Adolph Ronning, Minneapolis, Minn.

Application May 1, 1940, Serial No. 332,763

12 Claims. (Cl. 280—87)

This invention relates to a vehicle wheel suspension device. The primary object is to provide means whereby two closely spaced vehicle wheels may be effectively supported for differential up and down movements to thereby maintain equal ground engagement and equal load distribution to the wheels during their travel over irregular ground surfaces.

Another object is to provide vehicle wheel suspension means so constructed and arranged that adequate spring suspension may be had on even the heaviest of vehicles and without at the same time requiring that the mounting unit or member be so greatly enlarged that it will prevent the wheels from being closely spaced in the most desirable manner.

Another object is to provide a device of this nature which may be adapted for mounting on the rigid portions of the vehicle frame or upon a movable member or steering post thereof for the purpose of steering the wheels.

These and other more detailed and specific objects will be disclosed in the course of the following specification, references being had to the accompanying drawing, in which—

Fig. 1 is a side elevation of my wheel suspension device secured to a portion of a vehicle frame in position for supporting wheels therefor, the near wheel being completely removed and the wheel at the far side being only partially shown.

Fig. 2 is an enlarged vertical and longitudinal section taken medially through the device as shown in Fig. 1 with the differential mechanism within the housing clearly shown.

Fig. 3 is a side elevation of my improved wheel suspension device as mounted upon the lower portion of a steering post or steering member.

Fig. 4 is a similar view but showing the device as mounted upon a different type of steering post or member.

Fig. 5 is an enlarged, vertical, cross-sectional view taken substantially along the line 5—5 in Fig. 2 but showing the entire suspension device.

Fig. 6 is a top plan view of a device of the type shown in Fig. 1 entirely removed from the vehicle and with the wheels represented in dotted lines.

Fig. 7 is a view similar to that of Fig. 1 but showing a rigid connection between the wheel supporting crank members and the differential mechanism in lieu of the spring connections previously shown.

The device as disclosed herein is similar in its general purpose, function and operation to the various types of wheel suspension means disclosed in my copending applications, Serial Nos. 219,369; 259,361; 297,292; 311,330; and 330,344, and to copending applications resulting in Patents Nos. 2,208,599; 2,208,600; 2,209,093; 2,209,094; 2,209,095; 2,208,601; 2,217,816; 2,217,817; and 2,217,818. References invited to these applications for comparative purposes.

Referring now with more particularity to the drawing, my present invention comprises a housing designated generally at 10 which is adapted to be secured to some part of the vehicle as will hereinafter be in particular described and to which housing the vehicle wheels, represented at A and B, are connected by crank acting members indicated generally at 11 and 12. Said housing 10 is made in two complementary sections 10a and 10b which are joined together upon a medial parting line or face by means of connecting bolts 13 so that the housing may be readily taken apart for the mounting of various parts therein. A lower portion of the housing is bored out to provide a bearing designated at 14 and through this bearing is mounted a transversely axised mounting pin 15. At one end the crank members 11 and 12 are apertured and provided with bearing bushings 16 which rotatably engage laterally extended ends of the pin 15 and which are retained thereon against outward displacement by nuts or similar fasteners 17 provided on the pin and bearing against washers 18 as clearly shown in Fig. 5. At their opposite ends the crank members 11 and 12 are provided with outwardly turned wheel mounting spindles 19 upon which the wheels A and B are rotatably mounted.

The upper portion of the housing 10 is provided with bearing openings 20 in transversely axised alignment and substantially parallel with the axis of the pin 15. Short differential or supporting shafts 21 are journaled through the aforesaid openings 20 in anti-friction bearings designated at 22 and outwardly of the housing these shafts 21 carry rigidly mounted spring mounting members or blocks 23 which are secured in place by the nuts 24. Spring arms or members 25 and 26 are respectively secured at opposite sides of the housing and over the crank members 11 and 12 and are retained in rigid engagement upon the members 23 by U bolts 27 and lower clamp plates 28. The spring arms or members 25 and 26 are preferably constructed from super-imposed spring leaves as clearly shown and at their extended ends are connected by conventional shackles 29 to the crank members 11 and 12 adjacent the wheel carrying ends thereof.

These spring arms 25 and 26 are connected by a differential acting mechanism arranged within the housing 10 and while I have herein shown and described one particular type of such mechanism it is to be understood that any suitable differential mechanism such as disclosed in my copending applications hereinbefore noted, may be used. In the present instance, inner ends of the shafts 21 are provided with rigidly mounted gear segments or sections 30 and 31 indicated in place by the nuts 32 and which are movable with the said shafts within a hollow cavity 33 formed in the housing. The gear segments 30 and 31 are spaced apart to receive therebetween a differential pinion 34 which is journaled by its short stub shaft 35 in a bearing 36 made in the housing so that the said pinion will mesh with both gear segments and will rotate on an axis at right angles to the axes of rotation.

The wheel suspension device as thus constructed may, as shown particularly in Figs. 1, 2, and 5, be rigidly mounted by bolts 37 upon a portion 38 of the vehicle frame and this mounting is so carried out that the axes of the pin 15 and the shafts 21 will be transversely and horizontally extended. The crank arms 11 and 12 thus extend longitudinally and are wheel supported for movement in up and down substantially parallel planes about the axis of the pin 15. In operation then, as either wheel A or B meets with an irregularity in the ground surface over which it travels, this wheel and its associated crank arm will be shifted up or down as the case may be and this action transmitted by the spring arms 26 to the differential mechanism within the housing 10 will cause an equal but opposite movement of the other wheel and crank arm. There results therefore at all times differential up and down movement of the wheels as they travel over irregular ground surfaces and it is obvious that the load distribution and ground contact to and of the wheels will remain constant at all times. The purpose and general advantages of this operation have been fully covered in my copending applications and should require no further description herein.

By my present construction I have provided several extremely important advantages which will now be set forth. It will be noted that the up and down movement of the crank arms responsive to wheel travel over irregular surfaces will be transmitted to the differential mechanism through the spring arms 25 and 26 which are so disposed and arranged that they will effectively absorb all of the shocks and jars incident to such movements of the wheels. These shocks are therefore prevented from reaching the differential mechanism or the frame of the vehicle. The length of the crank arms 11 and 12 may be extended to any reasonable limits and the spring arms 25 and 26 correspondingly extended, and it is thus possible to acquire entirely adequate spring suspension for even the heaviest of vehicles as will be readily understood. The foregoing results are obtained however, without the necessity of greatly enlarging or thickening the supporting housing and associated parts. This results from the novel coaxial pivoting of the crank arms and the superimposed arrangement of the differential connecting mechanism, it being readily possible of course to provide entirely adequate strength for the shafts 21 and gear connecting means within the housing without causing undue bulk and weight due to the short lengths and leverages thereof. Furthermore, the parallel superimposed relation of the bearings for the pin 15 and differential shafts 21 makes it possible to provide the required long bearing surface shaft 15 without greatly increasing the thickness of the entire structure.

Referring to Fig. 3 of the drawing, it is evident therefrom that my wheel mounting device may be used in connection with the closely spaced steerable wheels of the conventional row crop type of tractor. For this installation, the housing 10 is provided with an extension 39 having at the end thereof a vertically axised bearing 40 by which the housing may be rigidly secured to the lower end of the upright steering post 41 of the tractor. This bearing 40 is separable like the housing itself and is provided with clamp bolts 42 by which it is rigidly secured to the steering post to turn therewith. A portion of the housing 43 for the steering post is shown and the bearing 40 engages the under side of this housing to prevent upward displacement. The construction and arrangement of the crank arms 11 and 12 and of the spring arms 25 and 26, as well as all other associated parts remain the same as has been previously described. In operation, the entire wheel suspension device is shiftable in the horizontal plane by the usual manipulation of the steering post 41 to thus steer the wheels carried by the crank arms, and at the same time the said wheels are suspended for the very desirable differential up and down movements. This differential suspension of the wheels in combination with the resiliency afforded by the spring connection between the wheels and the differential mechanism greatly reduces strain upon the tractor and steering mechanism, as will be evident, and the aforesaid superimposed relation of the crank arms and differential mechanism makes it possible to provide a very strong and durable unit while maintaining the wheels in close spacing in relation to each other.

In Fig. 4 the structure of the wheel mounting device itself is identical with that previously described by the extension 39a of the housing and is provided at its upper end with a mounting flange 44 by which it may be secured through bolts 45 to the lower flanged end 46 of a different type of tractor steering post designated at 47. These joined flanges bear upwardly against a thrust bearing 48 on the steering post housing 49 and the wheel suspension device of course operates in the same manner as it does when mounted as shown in Fig. 3. This view, however, shows the adaptability of a device for different types of tractors.

Referring now to Fig. 7, a somewhat different type of wheel suspension device is provided in that the arms 25a and 26a are rigid instead of of spring material. These arms 25a and 26a are secured at one end to the shafts 21 as represented at 50 and at their other ends are connected by links 51 to the crank arms 11 and 12. The crank arms are mounted in the manner previously described to swing in vertical planes in respect to the housing 10 and it will be readily understood that the same operation will be obtained in this structure as in those previously described. However, there will be no resilient shock absorbing effect upon the wheels and differential mechanism and vehicle but such shock absorbing properties may be provided as desired by the employment as the differential connection between the arms of the mechanism disclosed in my copending application Serial No.

259,361 and filed March 2, 1939. This mechanism includes gear segments and connecting pinion similar to those shown herein, but with spring connection between the shafts and the gear segments to absorb the shocks. As a further expedient, it is of course possible to support the entire wheel suspension device of Fig. 7 by spring suspension means such as disclosed in my copending application resulting in Patent No. 2,209,095.

The operating parts within the housing 10 may run in an oil bath and this oil may be employed also to lubricate the bearings for the pin 15 by providing the pinion 34 with an axially extended passage 52 which may communicate with oil passage 53 in the pin 15 as clearly shown in Fig. 5. The escape of the oil through the bearings 22 is prevented by oil sealing rings 54 of conventional form.

Where the wheel suspension device is used in connection with steerable wheels, the wheel mounting spindles 19 may incline slightly outwardly and downwardly to provide the wheel camber desirable for best steering operation of the wheels.

The overhead or superimposed mounting and relation of the differential mechanism and spring suspension means with respect to the crank members 11 and 12 has the further advantage of removing all obstructions and minimizing projection beneath the wheel axis. The maximum clearance is therefore present at all times.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A vehicle wheel mounting, comprising a pair of wheel supported cranks mounted for up and down movements and for steering movement about a common vertical axis the transverse plane of which intersects the wheels, differential acting means for translating an up movement of either crank into a down movement of the other, and flexible means connecting the cranks to the differentially acting means.

2. A vehicle wheel mounting, comprising a pair of wheel supported crank members pivotally mounted for up and down movements with respect to the vehicle and for steering movement about a generally upright axis disposed between the wheels, differential mechanism operative for translating an up movement of either crank member to a down movement of the other, and shock absorbing spring members connected between the cranks and the differential mechanism.

3. A vehicle wheel mounting, comprising a housing mounted on the vehicle, a pair of crank members pivoted at corresponding ends to the housing for relative up and down movements at their other ends in substantially longitudinal planes, wheels mounted on the said other ends of the crank members, a differential mechanism in the housing above the pivoted ends of the crank members, and arms extended over the crank members and connected between the crank members and differential mechanism, and the said differential mechanism and connecting arms being arranged above the axes of the wheels to provide maximum clearance therebeneath.

4. A vehicle wheel mounting, comprising a housing, a pin transversely extended through a lower portion of the housing, crank members pivotally mounted on the pin for movement thereabout in substantially up and down longitudinal planes, wheels carried by the crank members, and differentially operating means in the housing including intermeshing gears disposed vertically above the said pin and operative for translating an up movement of one crank member to a down movement of the other.

5. A vehicle wheel mounting, comprising a housing supported by the vehicle, a pin mounted transversely through a lower portion of the housing, shafts supported in end to end arrangement in the housing above the pin, differential means connecting the shafts, crank members pivotally connected at corresponding ends to the pin for relative up and down movements in longitudinal planes at their other ends, wheels rotatably mounted on the said other ends of the crank members, and arm members connected at one end to the said shafts and at their other ends to the crank members, the said arm members being supported over the crank members and extended longitudinally thereof.

6. In a vehicle, a steerable member, a housing secured to the said member for steering movement therewith, crank members pivoted at corresponding ends to a lower portion of the housing and movable in up and down longitudinal planes with respect thereto, wheels rotatably secured to the upwardly and downwardly movable ends of the crank members, differential mechanism in the housing above the pivoted ends of the crank members, and arms extended lengthwise over the crank members and connected at opposite ends to the differential mechanism and crank members.

7. In a vehicle, a steering post, a housing having an extension and a bearing for detachable clamping engagement with the said post, whereby steering movement may be imparted to the housing by the steering post, crank members each pivoted at one end to a lower portion of the housing and movable in up and down longitudinal planes with respect thereto, wheels rotatably secured to the upwardly and downwardly movable ends of the crank members, differential mechanism in the housing above the pivoted ends of the crank members, and arms extended lengthwise over the crank members and connected at opposite ends to the differential mechanism and crank members.

8. In a vehicle, a steerable member having a flanged lower end, a housing having a flanged extension for detachable mounting on the said steerable member, crank arms pivotally mounted at corresponding ends to the housing and extended therefrom for relative up and down movements in substantially longitudinal planes, wheels rotatably mounted in the crank members for up and down movements therewith, differential mechanism in the housing above the pivoted ends of the crank members, and longitudinally extended arms connected between the differential mechanism and crank members for translating an up movement of either wheel to a down movement of the other.

9. A vehicle wheel mounting, comprising a housing mounted on the vehicle, a pair of crank members pivoted to the housing for relative up and down movements in substantially longitudinal planes, wheels journaled on the movable ends of the crank members, a differential mechanism in the housing above the pivoted ends of the crank members, rigid arms secured to the differential mechanism and extended over the crank members, and links pivotally connected between the arms and crank members for translating movement of one crank member through the differential mechanism to equal but opposite movement of the other member.

10. A vehicle wheel mounting comprising a housing forming a chamber adapted to contain a lubricant, a pair of wheel supported arms pivotally connected to the housing below said chamber, means for conducting lubricant from the chamber to the pivot connections of the arms, differential mechanism connecting the arms to actuate them in relatively opposite directions, said mechanism including working parts disposed in the bottom of the chamber so as to operate in the lubricant therein contained.

11. A steering unit for a vehicle comprising a mounting member steerable about a generally upright axis and including a housing disposed forwardly with respect to the transverse plane of the axis, a pair of arms pivoted to the lower end of the housing and extending rearwardly therefrom, wheels supporting the rear ends of the arms, and differential mechanism contained within the housing and connected to the arms to move them in opposite directions.

12. A steering unit for a vehicle comprising a mounting member steerable about a generally upright axis and including a housing disposed forwardly with respect to the transverse plane of the axis, a pair of arms pivoted to the lower end of the housing and extending rearwardly therefrom, wheels supporting the rear ends of the arms, and differential mechanism contained within the housing and connected to the arms to move them in opposite directions, said differential mechanism including yieldable lever acting members disposed outside the housing.

ADOLPH RONNING.